Morse & Herrick,

Knife Rest.

Nº 46,692. Patented Mar. 7, 1865.

Witnesses:
R. L. Topliff
Theo Tusch

Inventors:
G. L. Morse
L. W. Herrick
per Munn & Co
Attorneys

UNITED STATES PATENT OFFICE.

G. LIVINGSTON MORSE AND LUCRETIA M. HERRICK, OF HARRISON, NEW JERSEY.

IMPROVED KNIFE, FORK, AND SPOON HOLDER.

Specification forming part of Letters Patent No. 46,692, dated March 7, 1865.

*To all whom it may concern:*

Be it known that we, G. LIVINGSTON MORSE and LUCRETIA M. HERRICK, of Harrison, in the county of Hudson and State of New Jersey, have invented a new and useful Improvement in Spoon-Holders; and we do hereby declare that the following is a full, clear, and exact description thereof, which will enable others skilled in the art to make and use the same, reference being had to the accompanying drawings, forming part of this specification, in which—

Figure 1:
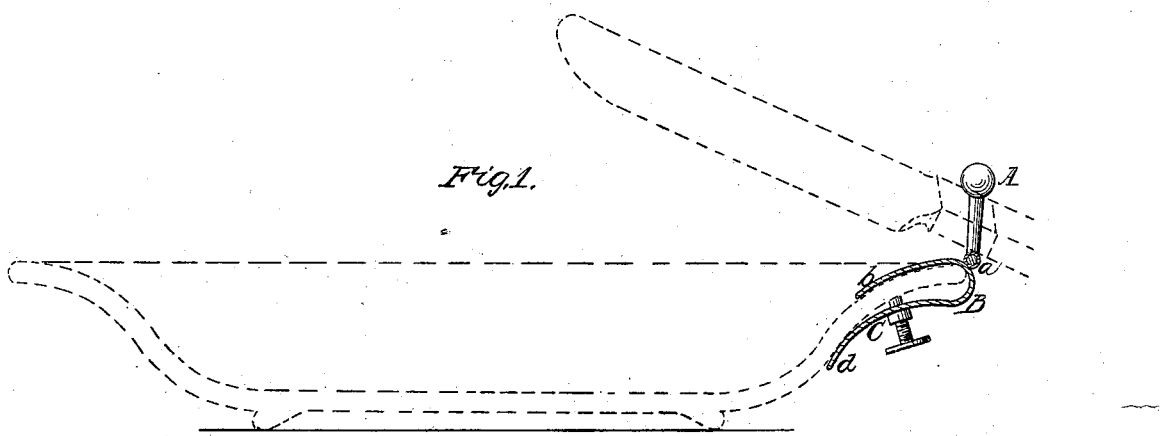
Figure 2:
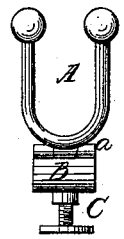
Figure 3:
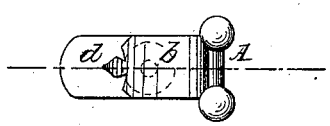

Figure 1 is a section of a spoon-holder made according to our invention, in which it is shown applied to the edge of a dish. Fig. 2 is a back view of the holder. Fig. 3 is a top view of the same.

Similar letters of reference indicate like parts.

This invention consists in an implement to be attached to dishes in order to hold the handles of spoons, knives, or forks, and prevent them sliding down and falling into the dishes in which they are used.

When one lays the handle of a spoon, knife, or fork upon the edge of a dish or bowl, in which the implement is used, in serving at a table or in culinary operations, the implement is apt to fall or slide down into the contents of the dish or bowl, thereby causing great annoyance from the loss of the spoon or other inplement, as well as from the untidiness which is inseparable from such an accident. Some culinary utensils have been made with hooks which turn downward from the ends of their handles, and which, when the utensil slides down in the dish or pot in which it is left, takes hold of the rim thereof, and is thereby kept from falling in it. This contrivance is ungainly in appearance, and makes an awkward and unhandy addition to a spoon or other utensil, and it has not been applied to utensils made for use at table.

Our invention is designed to prevent such accidents at table and elsewhere by means of an attachment to a dish or other vessel, and which may be made more or less ornamental, both by the choice of metals and by the skill of the artisan in ornamenting it.

The figures in the drawings show on example of our invention and the mode of attaching it to a dish and the manner of its use.

B is a clasp, made in this example of one piece of metal bent double, each limb $b$ $d$ being curved on concentric lines and possessing some elasticity, so as to be enabled to embrace rims of greater or less thickness. This clasp may be made with a hinge connecting its limbs $b$ $d$ at the bite of the clasp; but the form we have here shown is more simple and economical in construction. The lower limb, $d$, is tapped to receive a set-screw, C, which clamps the instrument to the rim or edge of any dish or vessel with which it is to be used.

A is a curved rest, meant to receive the handle of a spoon or such other utensils as are ordinarily used in connection with table and other dishes. It is hinged to the clasp on the upper part of its bite, so as to be capable of leaning toward or from the dish at different angles to suit large and small spoons or other utensils. The hinge $a$ should be stiff enough to keep the rest in whatever position it is placed; or it may be held by means of spring-pressure applied to the joint. The shape of the rest may be varied to suit the taste of the maker. We have shown it open above, its limbs being surmounted by balls, and the limbs being parallel with each other; but the limbs may be curved and closed at top by a bar hinged to one of the limbs, or by a spring-bar, if is it thought desirable on account of symmetry or for any other reason.

The holder may be removed at pleasure from one dish and attached to another, or laid aside until occasion arises for its use.

We claim as new and desire to secure by Letters Patent—

The combination of the hinged rest A with the clasp B C, constructed and employed as described.

G. LIVINGSTON MORSE,
LUCRETIA M. HERRICK.

Witnesses:
ELLA M. RAPELJE,
SIDNEY E. MORSE.